United States Patent [19]

Tsuzuki et al.

[11] Patent Number: 5,371,159
[45] Date of Patent: Dec. 6, 1994

[54] SOLUTION POLYMERIZATION WITH REACTIVE MODIFIER

[75] Inventors: Masahide Tsuzuki; Kaoru Komiya, both of Tokyo, Japan

[73] Assignee: Asahi Denka Kogyo K.K., Tokyo, Japan

[21] Appl. No.: 12,529

[22] Filed: Feb. 2, 1993

Related U.S. Application Data

[63] Continuation-in-part of Ser. No. 703,908, May 22, 1991, abandoned.

[30] Foreign Application Priority Data

May 23, 1990 [JP] Japan .................................. 2-131243
Apr. 26, 1991 [JP] Japan .................................. 3-97133

[51] Int. Cl.⁵ .................. C08F 216/20; C08F 230/02; C08F 228/00
[52] U.S. Cl. .................................. 526/212; 526/216; 526/220; 526/227; 526/230; 526/232.1; 526/219.1; 526/219.6; 526/240; 526/277; 526/287; 526/318.5; 526/329.6; 526/330; 526/333; 526/316; 526/320
[58] Field of Search ........... 526/333, 287, 277, 318.42, 526/228, 240, 212, 220, 227, 230, 232.1, 219.6, 318.5, 330

[56] References Cited

U.S. PATENT DOCUMENTS 4,814,514  3/1989  Yokota et al. ........................ 568/608

FOREIGN PATENT DOCUMENTS 244841    11/1987  European Pat. Off. .
62-10482   5/1987  Japan .
01119335   5/1989  Japan .
1-174511   7/1989  Japan .
1-174512   7/1989  Japan .
01174511   7/1989  Japan .
01174512   7/1989  Japan .

OTHER PUBLICATIONS

Chemical Patents Index, Documentation Abstracts Journal, Section A, Week 8916, 14–06–1989, A0872 No. 89-1198316, Derwent Publ. Ltd. London, GB; JP-A-10672361/Dai-ichi Kogyo S./(13-03-1989).

*Primary Examiner*—Joseph L. Schofer
*Assistant Examiner*—Mark Nagumo
*Attorney, Agent, or Firm*—Olson & Hierl, Ltd.

[57] ABSTRACT

An improved solution polymerization process is provided wherein vinyl monomers are polymerized in the presence of at least one reactive modifier which is a substituted alpha-olefin that incorporates at least three ether groups, is hydrophilic, and has a molecular weight of at least about 200. The modified vinyl polymers so produced are characterized by various improved physical properties including, in particular, electrical characteristics such as antistatic capacity.

22 Claims, No Drawings

SOLUTION POLYMERIZATION WITH REACTIVE MODIFIER

RELATED APPLICATION

This application is a continuation-in-part of our co-pending application, U.S. Ser. No. 703,908 filed May 22, 1991 now abandoned.

FILED OF THE INVENTION

The present invention relates to an improved solution polymerization process for making vinyl polymers which is conducted with a reactive modifier.

BACKGROUND OF THE INVENTION

Vinyl polymers, such as polyvinyl chloride, polyvinyl acetate, polystyrene, and the like, excel in physical and chemical properties, are easy to mold, and are widely used as general purpose resins. However, the recent expansion of their range of use has made it difficult to use vinyl polymers in many potential applications because of their inherent limiting physical properties. Some of these properties, such as electrical characteristics, water resistance, and the like, have to be modified to meet the needs and requirements of various applications.

Liquid phase polymerization procedures, such as emulsion polymerization, solution polymerization and sometimes suspension polymerization, are used to prepare vinyl polymers.

In emulsion polymerization, the monomers are dispersed as small droplets in a water solution of an emulsifier by agitation. After addition of catalyst (or initiator), polymerization occurs in emulsifier micelles (small association clusters) forming latex particles to which the monomers migrate from the droplet reservoirs. The temperature is controlled by the transfer of heat from or to the water medium surrounding the latex particles. Product polymer particles can be separated by filtration or centrifugation.

In solution polymerization, water is vigorously excluded to assure efficient use of the catalyst. The catalysts are different from those used in emulsion polymerization processes. The monomers are diluted with an organic solvent and polymerized in solution by the addition of the catalyst. The organic solvent serves as the reaction medium as well as a heat transfer medium. Bulk polymerization is a special form of solution polymerization but is seldom used for vinyl polymer manufacture. Product polymer is recovered from the residual solvent phase.

Suspension polymerization is similar in some respects to emulsion polymerization and is used to make some vinyl polymers. In suspension polymerization, liquid monomer is dispersed in water in the form of tiny droplets in a stirred reaction vessel. Usually, a polymerization initiator, such as a peroxide, is dissolved in the monomer phase. Upon heating, polymerization takes place in the monomer droplets in a manner essentially identical with mass polymerization. The continuous, low viscosity water phase facilitates heat transfer through the jacket of the reaction vessel. The product polymers are a dispersion of small polymer particles which can be separated from the water phase by filtering or centrifugation.

One technique for modifying vinyl polymer properties is to incorporate a reactive modifier into the product polymer structure during polymerization. However, known reactive modifiers are generally either unsatisfactory or have little useful modifying effect particularly in modified vinyl polymers made by solution polymerization.

The vinyl polymer art needs a new and improved solution polymerization procedure employing a new and effective reactive modifier in order to produce new and very useful modified vinyl polymer products with improved physical properties.

SUMMARY OF THE INVENTION

The present invention provides a new and improved solution polymerization process wherein vinyl monomer polymerization is carried out in the presence of at least one reactive modifier.

The present invention further provides new and improved modified vinyl polymers which are made by this process.

The product modified vinyl polymers are characterized by having improved physical properties compared to the properties of corresponding prior art unmodified vinyl polymers. The electrical characteristics, particularly antistatic properties, of the modified polymers are especially improved.

Only solution polymerization that is carried out as described herein using the present reactive modifiers achieves these results, so far as now known. For example, emulsion polymerization of a corresponding composition of vinyl monomer(s) and reactive modifier(s) does not result in a product polymer with the improved characteristics.

Reactive modifiers employed in the practice of this invention have a particular molecular structure and comprise substituted alpha-olefins that (a) incorporate at least three ether groups per molecule, (b) incorporate at least one hydrophilic group per molecule, and (c) have a molecular weight of at least about 200. Such reactive modifiers are characterized by the formula:

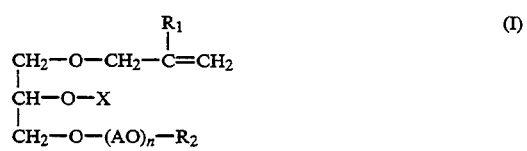

where

A represents an alkylene group containing from 2 through 4 carbon atoms inclusive;

$R_1$ represents a hydrogen atom or a methyl group;

$R_2$ represents either a hydrocarbon group or a monoacyl group in which each group contains from 1 through 24 carbon atoms inclusive;

n represents a positive whole number ranging from and including 0 through 50 (preferably, n is 0);

X represents one of the expressions:

where A represents an alkylene group containing from 2 through 4 carbon atoms inclusive, and m represents a positive whole number ranging from and including 1 through 100 inclusive), or

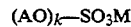

where A represents an alkylene group containing from 2 through 4 carbon atoms inclusive and k represents a positive whole number ranging from and including 1 through 50 inclusive, and M represents a hydrogen atom, alkali metal, alkaline earth metal, ammonium, or an organic ammonium group), or

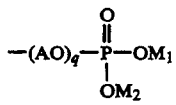

where A represents an alkylene group containing from 2 through 4 carbon atoms inclusive, q represents a positive whole number ranging from and including 0 through 50 inclusive; and $M_1$ and $M_2$ each represent an independently selected hydrogen atom, alkali metal, alkaline earth metal, ammonium, or organic ammonium group.

Reactive modifiers of Formula (1) display excellent monomer compatibility under solution polymerization conditions.

Also, polymers that are produced by solution polymerization in the presence of a reactive modifier of Formula (I) display surprising and unexpected modified polymer physical properties. For example, modified vinyl polymers so made display surprising and unexpected antistatic properties compared to the corresponding polymers made under emulsion polymerization conditions using the same reactive modifiers and vinyl monomers.

Another feature of the present invention is that the inventive solution polymerization process wherein vinyl polymers are prepared which are modified with a reactive modifier of Formula (I) can be practiced by using technology that is already generally known pertaining the vinyl monomer solution polymerization art, including solvent media, monomers, catalysts and polymerization conditions. Thus, and advantageously, the time and cost needed to develop new solution polymerization technology in order to use a reactive modifier of Formula (I) is avoided.

A reactive modifier of Formula (I) is typically added to solution polymerization media, in accord with this invention, so as to be present either at the beginning of, or during, monomer polymerization. The total amount of the reactive modifier that is present in a given solution polymerization reactor at any given time is variable, and also the total amount and type of the reactive modifier which is incorporated into a given product modified vinyl polymer is variable.

Other and further features, advantages, aspects, aims, objects, applications, uses, variations, embodiments and the like will be apparent to those skilled in the art from the present specification and the appended claims.

DETAILED DESCRIPTION

A reactive modifier of Formula (I) includes an alpha-olefinic group which allows radical polymerization. Preferably, in given solution polymerization, a Formula (I) reactive modifier is also adapted either to be grafted into a vinyl polymer that is being produced, or to be copolymerized with the vinyl monomers present. As a result, the properties of a product vinyl polymer are modified.

Further, due to the fact that the nonionic or anionic hydrophilic group represented by X in Formula (I) contains alkylene oxide chains, such as $(AO)_m$, $(AO)_k$, or $(AO)_q$, a reactive modifier of Formula (I) exhibits excellent compatibility with monomers under the solution phase conditions that are used in solution polymerization, and, at the same time, allows easy adjustment of hydrophilicity either by appropriately selecting the length of the alkylene oxide chains, or by appropriately selecting the kind of alkylene oxide constituting the chains, in a Formula (I) compound. Thus, for purposes of achieving a desired product modified vinyl polymer from a given solution polymerization, the structure of the selected reactive modifier of Formula (1) can be varied.

Thus, a reactive modifier of Formula (I) can achieve an improvement both in monomer compatibility and in polymer modifying capacity under solution polymerization conditions.

A reactive modifier of Formula (I) can be manufactured, for example, by a method in which a (meth)allylglycidyl ether, more preferably allylglycidyl ether, is allowed to react with a hydroxyl compound which can be represented by the general expression: HO—(AO)-n—$R_2$ (where $R_2$, A and n are each as hereinabove defined) in the presence of a well-known catalyst, such as a tertiary amine, quaternary ammonium salt, boron trifluoride ether complex salt, zinc borofluoride, tin tetrachloride, aluminum chloride, sodium hydroxide, potassium hydroxide, or the like at a temperature in the range of about 50° to about 160° C. for a period of time which is preferably sufficient to result in the complete reaction of all epoxy groups present. This time period, for example, is usually in the range of about 3 to about 20 hours.

There is thus obtained a compound which can be represented by the formula:

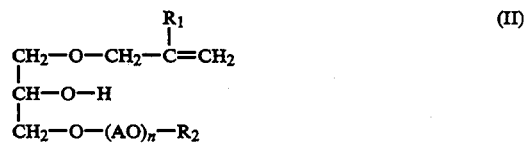

where A, $R_1$ and $R_2$ are each as hereinabove defined.

Examples of hydrocarbon groups containing from 1 through 24 carbon atoms inclusive (see $R_2$ in Formula (I)) include a straight- or branched-chain alkyl group, alkenyl group, or aryl group. Illustrations of particular groups include methyl, ethyl, propyl, isopropyl, butyl, sec-butyl, t-butyl, pentyl, t-amyl, hexyl, heptyl, octyl, 2-ethylhexyl, nonyl, decyl, dodecyl, lauryl, tridecyl, myristyl, stearyl, oleyl, cetyl, benzyl, phenethyl, or the like. An aryl group, for example, may be replaced by an alkyl group, an alkaryl group, an aralkyl group, an aryloyl group or the like.

Further examples of particular groups include phenyl, o-, m-, p-, or mixed cresoyl, xylenoyl, propyl phenyl, isopropyl phenyl, butyl-phenyl, sec-butyl phenyl, t-butyl phenyl, di-t-butyl phenyl, t-amyl phenyl, octyl phenyl, 2-ethyl hexyl phenyl, dioctyl phenyl, nonyl phenyl, dinonyl phenyl, dodecyl phenyl, methyl diphenyl, trimethyl diphenyl, styrenated phenyl, styrenated cresoyl, styrenated xylenoyl, benzylated phenyl, or the like. These illustrations, however, should not be construed as restrictive.

Examples of acyl groups containing from 1 through 24 carbon atoms inclusive (see $R_2$ in Formula (I)) include reactive carboxylic acid residues, such as residues of acids including caprylic, pelargonic, capric, undecanoic, lauric, myristic, palmitic, stearic, linoleic, arachic, or the like. Also included among suitable acid residues are reactive derivatives, such as acid halides, acid anhydrides and other reactive derivatives of such acids. These illustrations, however, should not be construed as restrictive.

Further, to incorporate into a compound of Formula (I) a nonionic hydrophilic group, a compound of Formula (II) is allowed to react with an alkylene oxide containing from 2 through 4 carbon atoms inclusive in the presence of a catalyst, such as sodium hydroxide, potassium hydroxide, boron trifluoride, or the like, using a pressurizable reactor maintained at a temperature in the range of about 80° to about 160° C., thereby obtaining a product compound which can be expressed by the formula:

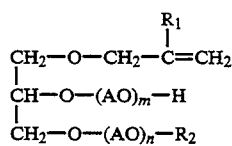

$$\begin{array}{c} R_1 \\ | \\ CH_2-O-CH_2-C=CH_2 \\ | \\ CH-O-(AO)_m-H \\ | \\ CH_2-O-(AO)_n-R_2 \end{array} \quad (III)$$

where A, n, m, $R_1$ and $R_2$ are each as defined above.

Examples of suitable starting alkylene oxides include ethylene oxide, propylene oxide, butylene oxide and the like. It is possible to employ only one of these oxides or to use two or more of them in combination for making a compound of Formula (III). Further, the starting alkylene oxide may be added while making a Formula (I) compound in a block-like manner, if desired.

It is desirable for the polyoxyalkylene chain identified as $—(AO)_m—$ in Formula (III) to contain a polyoxyethylene chain and the content thereof is preferably in the range of about 10 to about 100 weight percent (based on the total weight of the group $—(AO)_m—$).

Further, to incorporate into a compound of Formula (III) an anionic hydrophilic group, a compound of Formula (III) is sulfonated and anionized by the usual method using an inorganic sulfur-containing acid, such as sulfuric acid, sulfuric anhydride, chlorosulfonic acid, sulfamic acid, or the like, thereby to obtain a compound which can be represented by the formula:

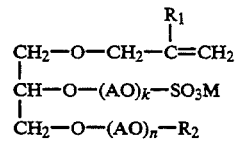

$$\begin{array}{c} R_1 \\ | \\ CH_2-O-CH_2-C=CH_2 \\ | \\ CH-O-(AO)_k-SO_3M \\ | \\ CH_2-O-(AO)_n-R_2 \end{array} \quad (IV)$$

where A, n, k, M, $R_1$ and $R_2$ are each as hereinabove defined.

Alternatively, a compound represented by either Formula (II) or Formula (III) is phosphated and anionized by the usual method using an inorganic phosphorous containing material, such as phosphorous pentoxide, polyphosphoric acid, or the like, thereby to obtain a compound which can be represented by the formula:

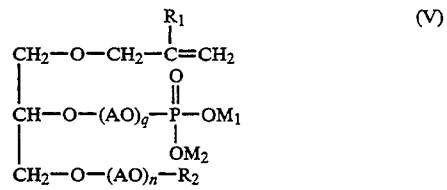

$$\begin{array}{c} R_1 \\ | \\ CH_2-O-CH_2-C=CH_2 \\ | \quad\quad O \\ | \quad\quad \| \\ CH-O-(AO)_q-P-OM_1 \\ | \quad\quad | \\ \quad\quad OM_2 \\ CH_2-O-(AO)_n-R_2 \end{array} \quad (V)$$

where A, $R_1$, $R_2$, n, q, $M_1$ and $M_2$ are each as hereinabove defined.

Examples of suitable organic ammonium groups (see M, $M_1$ and $M_2$ in Formula (IV) and Formula (V)) include monoalkanol ammonium, dialkanol ammonium, trialkanol ammonium, monoalkyl ammonium, dialkyl ammonium, trialkyl ammonium, and the like. Illustrations of particular organic ammonium groups include monomethanol ammonium, monoethanol ammonium, monopropanol ammonium, monobutanol ammonium, monoisopropanol ammonium, trimethanol ammonium, monoethanol monomethanol ammonium, diethanoi ammonium, trimethyl ammonium, diethyl monomethanol ammonium, monoethanol dimethyl ammonium, and the like. These illustrations, however, should not be construed as restrictive.

Particularly preferred as M, $M_1$ or $M_2$ substituents in Formula (IV) or Formula (V) are ammonium, monoethanol ammonium, diethanoi ammonium, monoisopropanol ammonium, diethyl ammonium, and monoisopropyl ammonium.

Examples of vinyl polymers which are modifiable by a reactive modifier of Formula (I) include polymers prepared by polymerizing under solution polymerization conditions one or more starting vinyl monomers of which the following vinyl monomers are illustrative:

Vinyl esters, such as vinyl acetate dibutyl maleate, or the like; styrene or styrene derivatives; (meth)acrylic esters, such as ethyl (meth)acrylate, butyl (meth)acrylate, or the like; α,β-unsaturated carboxylic acids, α,β-unsaturated amides such as (meth)acrylic amide, N-methylacrylic amide, N-methylolacrylic amide, N-methylacrylic amide, N-methylolacrylic amide, or the like; α-olefins, such as ethylene, propylene, 1-butene, 1-hexene, 1-octene, 1-isopentene, or the like; substituted α-olefins, such as (meth)acrylonitrile, vinyl chloride, vinylidene chloride, or the like; conjugated dienes, such as butadiene, 1,3-pentadiene, or the like; alkyl vinyl ethers; alkyl vinyl ketones; maleic anhydride; maleates, such as dibutyl maleate or the like; itaconic esters; and crosslinking divinyl compounds, such as divinyl benzene, ethylene glycol dimethacrylate, methylene bisacrylic amide, or the like. These illustrations, however, should not be construed as restrictive.

A reactive modifier of Formula (I) can be used in various amounts in accordance with the type of vinyl monomers involved, the purpose or objective of the product vinyl polymer modification, the modified vinyl polymer properties required, and the like.

Typically, an amount in the range of about 0.1 to about 95 weight percent of total reactive modifier of Formula (I) can be used with respect to the amount of total monomer used so that the weight percent of vinyl monomer correspondingly is in the range of about 99.9 to about 5 weight percent, based on the 100 total compositional weight percent of reactive modifier plus vinyl monomer. More or less reactive modifier of Formula (I) can be used, if desired.

A reactive modifier of Formula (I) can be used for the purpose of attaining an improvement in one or more of various vinyl polymer characteristics, or properties, such as water resistance, adhesive property, antistatic property, defogging property, dye-affinity, film forming property, weather resistance, anti-blocking property, and/or the like.

The preferred amount of reactive modifier of Formula (I) that is used in any given process embodiment is dependent upon (that is, is influenced by) the properties desired in a product polymer. For one example, in cases where the reactive modifier of Formula (I) is used with a view to imparting compatibility to a product modified vinyl polymer for use in polymer alloys, it is desirable and presently preferred for the total amount of the reactive modifier(s) of Formula (I) to be in the range of about 0.1 to about 20 weight percent based on the combined weight of the reactive modifier with the vinyl monomer(s).

For another example, when a water soluble vinyl polymer with low hydrophilicity is to be converted into a modified vinyl polymer with when high hydrophilicity, it is desirable to employ about 10 to about 80 weight percent of at least one reactive modifier of Formula (I) based on the combined weight of the reactive modifier with the vinyl monomer (s).

In Formula (1) compounds when X is the expression —$(AO)_m$—H, the group —$(AO)_m$— is preferably a (poly)oxyethylene chain. In Formula (1) compounds when X is the expression —$(AO)_k$—$SO_3M$, the group —$(AO)_m$— is preferably a (poly)oxyalkylene chain and M is preferably selected from the group consisting of ammonium monoethanol ammonium, diethanol ammonium, monoisopropanol ammonium, diethyl ammonium and monoisoproyl ammonium (and, more preferably, M is ammonium or organic ammonium). In Formula (1) compounds, when X is the expression

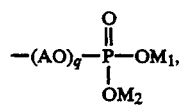

the group —$(AO)_q$— is preferably a (poly)oxyalkylene chain and $M_1$ and $M_2$ an each preferably independently selected from the group consisting of ammonium, monoethanol ammonium, diethanol ammonium, monoisopropanol ammonium, diethyl ammonium and monoisopropyl ammonium (and, more preferably, M is ammonium or organic ammonium).

One advantage of a reactive modifier of Formula (I) is that it has excellent compatibility with vinyl monomers under solution polymerization conditions.

By virtue of its excellent monomer compatibility under solution polymerization conditions, a reactive modifier of Formula (I) helps to achieve uniform modified vinyl polymers, thus providing an excellent modification effect in a product polymer.

Also, a reactive modifier of Formula (I) produces hydrophilicity adjustment in product modified vinyl polymers with ease, the extent of the adjustment that is achieved in any given modified vinyl polymer being influenced by the kind of starting vinyl monomer(s) used and by the amount and particular reactive modifier(s) of Formula (I). As a consequence, the amount and type of reactive modifiers of Formula (I) that are used in solution polymerization with vinyl monomers in accord with this invention can be widely varied.

A modified vinyl polymer that is produced by the process of this invention characteristically can exhibit one or more of the following improved properties: water resistance, antistatic property, adhesive property, defogging property, staining property, film forming property, weather resistance, or the like as compared to, for example, the corresponding properties in unmodified prior art vinyl polymers.

Further, a reactive modifier of Formula (I) as employed in the present invention helps to impart polymer compatibility to product modified vinyl polymers so that they can be used in formulations with other polymers to produce polymer alloys.

A solution polymerization process of this invention can be carried out with at least one solution polymerization catalyst such as has been heretofore employed in the art of solution polymerization. Examples of suitable polymerization catalysts include t-butylhydroperoxide, di-t-butylperoxide, cumenehydroperoxide, acetylperoxide, benzoylperoxide, lauroylperoxide, azobisisobutylonitrile, azobis-2,4-dimethylvaleronitrile, azobiscyclohexanecarbonitrile and the like. These catalysts can be used in amounts that are in the range of about 0.05 to about 5 percent by weight based on total weight of catalyst plus monomer used.

Among the suitable catalysts, a peroxide catalyst can be used at a much lower polymerization temperature by using this catalyst together with a reducing agent, such as dimethylaniline or the like, thereby to provide a redox catalyst. In such a case, the weight ratio of peroxide catalyst to reducing agent can vary, but is preferably in the range of about 1:4 to about 4:1.

A solution polymerization process of this invention can be carried out with an organic solvent such as has been heretofore employed in the art of solution polymerization. The organic solvent is a liquid (under the process conditions) that is substantially inert relative to the vinyl monomer, the catalyst and the reactive modifier. The solvent used can have, for example, a boiling point that is lower than about 100° C. Examples of suitable solvents include benzene, toluene, xylene, ethyl acetate, methylalcohol, dimethylformamide and the like. Solvent mixtures can be employed if desired.

The relative amount of solvent used can be adjusted in any given process embodiment so as to influence the viscosity of the product polymer produced. Typically, the weight ratio of monomer to solvent is in the range of about 1:20 to about 20:1.

A solution polymerization process of this invention can be carried out at various solution phase temperatures such as have been heretofore employed in the art of solution polymerization. A suitable reaction temperature is in the range of about 30° to about 130° C., and, more preferably, is in the range of about 40° to about 100° C.

Embodiments

The present invention is further illustrated by the following Examples.

Example 1: Reactive Modifier Preparation (i) In an four-necked flask of 1-liter capacity, equimolar reaction was effected between nonyl phenol (440 g) and allylglycidyl ether (228 g) at a temperature of 90°±5° C. using NaOH as catalyst.

(ii) 334 g of the product obtained in (i) was fed into a pressure reactor of 1-liter capacity and 220 g ethylene oxide was added thereto over a period of 6 hours at 130° C., 1.5 kg/cm². The reaction mixture was maintained at that temperature and pressure for 4 hours to complete the addition reaction and provide a reactive modifier of Formula (I).

Example 2: Reactive Modifier Preparation (i) A reaction identical with that of Example 1 was effected except for the fact that methallylglycidyl ether was used instead of allylglycidyl ether.
(ii) The product obtained in (i) was fed into a pressure reactor and 5 moles of ethylene oxide was added per mole. Afterwards, 10 moles of propylene oxide was added providing a reactive modifier of Formula (I).

Example 3: Reactive Modifier Preparation (i) A reaction identical with that of Example 1 was effected except for the fact that coconut fatty acid was used instead of nonyl phenol.
(ii) The product obtained in (i) was fed into a pressure reactor and 10 moles of ethylene oxide was added per mole providing a reactive modifier of Formula (I).

Example 4: Reactive Modifier Preparation (i) A reaction identical with that of Example 1 was effected except for the fact that an excessive amount of a secondary alcohol of a carbon number of 12 to 14 (mixture ratio $C_{12}$:$C_{13}$:$C_{14}$=1:2:1) with 5 moles of ethylene oxide added thereto was used instead of nonyl phenol.
(ii) The product obtained in (i) was fed into a pressure reactor and 5 moles of ethylene oxide and 10 moles of propylene oxide were added at random per mole to provide a reactive modifier of Formula (I).

Example 5: Reactive Modifier Preparation (i) A reaction identical with that of Example 1 was effected except for the fact that distyrenated phenol was used instead of nonyl phenol.
(ii) The product obtained in (i) was fed into a pressure reactor and 5 moles of propylene oxide was added per mole. Afterwards, 10 moles of ethylene oxide was added to provide a reactive modifier of Formula (I).

Example 6: Reactive Modifier Preparation

A reactive modifier obtained in the same way as in Example 1 was sulfonated by the usual method using chlorosulfonic acid and was neutralized by monoethanol amine to provide a reactive modifier of Formula (I).

Example 7: Reactive Modifier Preparation

A reactive modifier obtained in the same way as in Example 1 was sulfonated and formed into an ammonium salt by the usual route of using sulfamic acid, thereby providing an anionic reactive modifier of Formula (I).

Example 8: Reactive Modifier Preparation

A reactive modifier obtained in the same way as in Example 1 was phosphated and formed into an ammonium salt by the usual route of using phosphorous pentoxide, thereby providing an anionic reactive modifier of Formula (I).

Example 9: Reactive Modifier Preparation

A reactive modifier obtained in the same way as in Example 1 was phosphated and formed into a monoethanol amine salt by the usual route of using phosphorous pentoxide, thereby providing an anionic reactive modifier of Formula (I).

Example 10: Reactive Modifier Preparation (Comparison)

(i) A reaction identical with that of Example 1 was effected except for the fact that nonyl phenol with 30 moles of ethylene oxide added thereto was used instead of nonyl phenol.
(ii) The product obtained in (i) was evaluated for use as a reactive modifier.

Example 11: Evaluation of Monomer Compatibility

To evaluate the modifiers of Examples 1-10 for compatibility with monomers in an organic solvent medium such as could be used in a solution polymerization process, 2 g of each of the modifiers of Examples 1 through 10 was mixed with 10 g each of styrene, methacrylic acid, vinyl acetate and acrylonitrile.

The results are shown in Table 1.

TABLE I

| Monomer | Styrene | Methacrylic acid | Vinyl acetate | Acrylonitrile |
|---|---|---|---|---|
| Example 1 | @ | @ | @ | @ |
| Example 2 | @ | @ | @ | @ |
| Example 3 | @ | @ | @ | @ |
| Example 4 | @ | @ | @ | @ |
| Example 5 | @ | @ | @ | @ |
| Example 6 | @ | @ | @ | @ |
| Example 7 | @ | @ | @ | @ |
| Example 8 | @ | @ | @ | @ |
| Example 9 | @ | @ | @ | @ |
| Example 10 | ▲ | ▲ | ▲ | ▲ |

In Table 1, the symbol @ indicates complete dissolution and the symbol ▲ indicates partial dissolution or partial dispersion. As Table 1 shows, only the reactive modifier of comparative Example 10 is not fully compatible with any of the monomers evaluated.

Example 12: Solution Polymerization and Polymer Evaluation 100 g of xylene was fed into a reactor container equipped with a reflux condenser, an agitator, a dropping funnel and a thermometer. The container atmosphere was replaced with nitrogen gas.

Separately, an individual mixture solution was prepared with respect to each one of the reactive modifiers obtained in Examples 1 through 10. Each solution contained 150 g of styrene, 7.5 g of the modifier, 2 g of benzoyl peroxide and 1 g of ditertiary butyl peroxide. Each solution was continuously trickled down into the reactor container and into a separate charge of xylene and maintained at a reaction temperature of 130° C. for a period of two hours. Further, a mixture solution containing 10 g of xylene, 0.5 g of benzoyl peroxide and 0.5 g of ditertiary butyl peroxide was added dropwise to effect solution for two hours. Afterwards, the reaction mixture was cooled and 90 g of xylene was added providing a polymer solution.

A 0.2 mm thick polymer film was prepared by the usual method from each of the polymer solutions obtained. Each polymer film was evaluated in terms of water resistance, defogging property and antistatic property.

The evaluation results obtained are shown in Table 2. The methods of measurement and evaluation were as follows:

(a) Water Resistance of the Film:

1 g of the polymer film was put in boiling water, boiled for 24 hours, and then dried at 105° C. for two hours. The film was observed for any change taking place during these processes and the following notations were used: : no change, O: partial fogging on the film surface, ▲: partial deformation of the film, X: complete deformation of the film.

(b) Defogging Property of the Film:

The contact angle of water with respect to the polymer film was measured.

(c) Antistatic Property of the Film:

The surface resistivity of the polymer film was measured after allowing it to stand for 24 hours in an atmosphere with a humidity of 45% maintained at a temperature of 20° C.

Example 13: Solution Polymerization and Polymer Evaluation 100 g of xylene was fed into a reactor container equipped with a reflux condenser, an agitator, a dropping funnel and a thermometer. The container atmosphere was replaced with nitrogen gas.

Separately, an individual mixture solution was prepared with respect to each one of the reactive modifiers obtained in Examples 1, 7 and 9. Each solution contained 75 g of 2-ethylhexyl acrylate, 7.5 g of the modifier, 2 g of benzoyl peroxide and 0.5 g of ditertiary butyl peroxide. Each solution was continuously trickled down into the reactor container and into a separate charge of xylene and maintained at a reaction temperature of 130° C. for a period of two hours. Further, a mixture solution containing 10 g of xylene, 0.5 g of benzoyl peroxide and 0.5 g of ditertiary butyl peroxide was added dropwise to effect solution for two hours. Afterwards, the reactor was cooled and 90 g of xylene was added to provide a polymer solution.

A 0.2 mm thick polymer film was prepared by the usual method from each of the polymer solutions obtained. Each polymer film was evaluated for its properties in the same manner as in Example 12.

The results obtained are shown in Table 2.

TABLE 2

|  | Modifier | Water resistance | Contact angle (*) | Surface resistivity (Ω) |
| --- | --- | --- | --- | --- |
| Solution Polymerization Ex. 12 | Example 1 | ⊚ | 35.7 | $4.8 \times 10^{11}$ |
| | Example 2 | ⊚ | 33.9 | $4.6 \times 10^{11}$ |
| | Example 3 | ⊚ | 34.2 | $4.0 \times 10^{11}$ |
| | Example 4 | ⊚ | 36.3 | $3.1 \times 10^{11}$ |
| | Example 5 | ⊚ | 34.5 | $5.5 \times 10^{11}$ |
| | Example 6 | ⊚ | 34.3 | $4.3 \times 10^{11}$ |
| | Example 7 | ⊚ | 35.1 | $5.2 \times 10^{11}$ |
| | Example 8 | ⊚ | 35.3 | $5.1 \times 10^{11}$ |
| | Example 9 | ⊚ | 34.1 | $4.6 \times 10^{11}$ |
| | Example 10 | ▲ | 43.6 | $8.2 \times 10^{11}$ |
| Solution Polymerization Ex. 13 | Example 1 | ⊚ | 30.4 | $1.5 \times 10^{11}$ |
| | Example 7 | ⊚ | 31.5 | $2.1 \times 10^{11}$ |
| | Example 9 | ⊚ | 32.1 | $2.3 \times 10^{11}$ |

The results shown in Table 2 illustrate that water resistance, contact angle, and surface resistivity are all improved in the modified vinyl polymers prepared with reactive modifiers of Formula (I).

Example 14: Comparison of Solution and Emulsion Polymerization

Polymer samples were prepared by a first solution polymerization (identified as solution polymerization 1) by the procedure according to Example 12 using xylene as the solvent and the reactive modifier from each Examples 1, 7 and 9, respectively. A 0.2 mm thick polymer film was then prepared by the usual method from each of the solution polymerization products.

Polymer samples were prepared by a second solution polymerization (identified as solution polymerization 2) by the procedure according to Example 13 using xylene as the solvent and the reactive modifier from each of Examples 1, 7 and 9, respectively. A 0.2 mm thick polymer film was then prepared by the usual method from each of the solution polymerization products.

Polymer samples were prepared by emulsion polymerization (identified as emulsion polymerization 1) as follows: 200 g of water was fed into a reactor equipped with reflux condenser, an agitator, a dropping funnel, and a thermometer and the system atmosphere was replaced with nitrogen gas. Separately, a mixture solution was prepared with respect to each of the reactive modifier obtained in Examples 1, 7 or 9. Each solution contained 150 g of styrene and 7.5 g of the modifier. 8.4 g of the solution, 0.16 g of potassium persulfate and 0.04 g of sodium bisulfite were then added to the reactor and polymerization was initiated at 50° C. The rest of the mixture solution of styrene and the modifier was continuously trickled down into the reactor for period of two hours. An emulsified product was obtained by letting this reaction mixture stand for a two hour aging period after completion of the reaction. These polymer samples were comparable to polymer samples produced by solution polymerization 1. A 0.2 mm thick polymer film was then prepared by the usual method from each of these emulsion polymerization products.

Polymer samples were prepared by emulsion polymerization (identified as emulsion polymerization 2) Emulsion polymerization according to the preceding method above described was carried out except that 150 g of styrene was replaced by 75 g of 2-ethylhexyl acrylate. These polymer samples were comparable to the polymer samples produced by solution polymerization 2. A 0.2 mm thick polymer film was then prepared by the usual method from each of the emulsion polymer products prepared as above described.

Tests of the samples prepared as above described were carried out:

(a) Test for Electrostatic Voltage (ESV)

Apparatus: STATIC HONESTMETER (Shishido Trading Co.) using EPR-100A high sensitive recorder.

Direct current high voltage (10KV) was applied to the film by corona discharge and electrostatic voltage at the surface of the film was measured.

(b) Test for Half-Life Period (HLP)

The time in second (s) for the electrostatic voltage at the surface to reduce to one half after application of 10KV on the film was measured.

(c) Results

The results obtained from the above measurements are shown in Tables 3 and 4:

TABLE 3

| Reactive | Solution polymerization 1 | | Emulsion polymerization 1 | |
|---|---|---|---|---|
| Modifier | ESV (KV) | HLP(s) | ESV (KV) | HLP (s) |
| Example 1 | 0.13 | 1.2 | 1.45 | 15.3 |
| Example 7 | 0.16 | 0.8 | 1.85 | 19.7 |
| Example 9 | 0.15 | 1.4 | 1.25 | 13.6 |

TABLE 4

| Reactive | Solution polymerization 2 | | Emulsion polymerization 2 | |
|---|---|---|---|---|
| Modifier | ESV (KV) | HLP(s) | ESV (KV) | HLP (s) |
| Example 1 | 0.05 | 0.5 | 1.05 | 11.6 |
| Example 7 | 0.03 | 0.3 | 1.24 | 14.7 |
| Example 9 | 0.06 | 0.6 | 1.18 | 12.1 |

As can be seen from Tables 3 and 4, when, on the one hand, the reactive modifiers of Formula I are used in solution polymerization, excellent anti-static properties are achieved in the produced modified vinyl polymers. On the other hand, when the same reactive modifiers are used comparably in emulsion polymerization, no practical antistatic properties are obtained in the product modified vinyl polymers.

The present invention is not intended to be limited by the preceding illustrative teachings including the foregoing Examples.

What is claimed is:

1. In a solution polymerization process where a solution of at least one vinyl monomer and at least one solution polymerization catalyst in an organic solvent is maintained at an elevated temperature for a time which is sufficient for at least a portion of said vinyl monomer to polymerize, the improvement which comprises carrying out said process in the presence of at least one reactive modifier which is dissolved in said solvent and which is represented by the general formula:

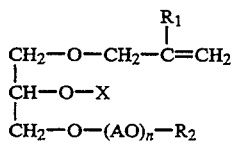

where:
- A is an alkylene group containing from 2 through 4 carbon atoms inclusive,
- $R_1$ is selected from the group consisting of hydrogen and methyl,
- $R_2$ is selected from the group consisting of hydrocarbon groups and monoacyl groups each of which groups contains from and including 1 through 24 carbon atoms inclusive,
- n is positive whole number ranging from and including 0 through 50 inclusive, and
- X is a monovalent group selected from the class consisting of:

—(AO)$_m$—H where:
- A is an alkylene group containing from 2 through 4 carbon atoms inclusive, and
- m is a positive whole number ranging from and including 1 through 100 inclusive, —(AO)$_k$—SO$_3$M where:
- A is an alkylene group containing from 2 through 4 carbon atoms inclusive,
- M is selected from the group consisting of hydrogen, alkali metals, alkaline earth metals, ammonium, and organic ammonium, and
- k is a positive whole number ranging from and including 1 through 50 inclusive, and

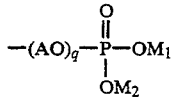

where:
- A is an alkylene group containing from 2 through 4 carbon atoms inclusive,
- $M_1$ and $M_2$ are each independently selected from the group consisting of hydrogen, alkali metals, alkaline earth metals, ammonium, and organic ammonium, and
- q is a positive whole number ranging from and including 1 through 50 inclusive.

2. The process of claim 1 wherein, in said reactive modifier, X is represented by the expression: —(AO)$_m$—H wherein A and n are each as defined.

3. The process of claim 2 wherein, in said expression —(AO)$_m$—H, the group —(AO)$_m$— is a (poly)oxyethylene chain.

4. The process of claim 1 wherein, in said reactive modifier, X is represented by the expression: —(AO)$_k$—SO$_3$M wherein A, k and M are each as defined.

5. The process of claim 4 wherein, in said expression —(AO)$_k$—SO$_3$M, M is selected from the group consisting of ammonium and organic ammonium.

6. The process of claim 4 wherein, in said expression —(AO)$_k$—SO$_3$M, M is selected from the group consisting of ammonium, monoethanol ammonium, diethanol ammonium, monoisopropanol ammonium, diethyl ammonium and monoisopropyl ammonium.

7. The process of claim 4 wherein, in said expression —(AO)$_k$—SO$_3$M, the group —(AO)$_k$— is a (poly)oxyalkylene chain and M is selected from the group consisting of ammonium and organic ammonium.

8. The process of claim 4 wherein, in said expression —(AO)$_k$—SO$_3$M, the group —(AO)$_k$— is a (poly)oxyethylene chain and M is selected from the group consisting of ammonium, monoethanol ammonium, diethanol ammonium, monoisopropanol ammonium, diethyl ammonium and monoisopropyl ammonium.

9. The process of claim 1 wherein, in said reactive modifier, X is represented by the expression:

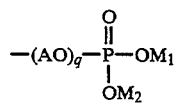

wherein A, q, $M_1$ and $M_2$ are each as defined.

10. The process of claim 9 wherein, in said reactive modifier, $M_1$ and $M_2$ are each independently selected from group consisting of ammonium, monoethanol ammonium, diethanol ammonium, monoisopropanol ammonium, diethyl ammonium and monoisopropyl ammonium.

11. The process of claim 9 wherein, in said reactive modifier, said group —$(AO)_q$— is a (poly)oxyalkylene chain and wherein $M_1$ and $M_2$ are each independently selected from the group consisting of ammonium and organic ammonium.

12. The process of claim 9 wherein, in said reactive modifier, said expression —$(AO)_q$— is a (poly)oxyethylene chain and wherein $M_1$ and $M_2$ are each independently selected from a group consisting of ammonium, monoethanol ammonium, diethanoi ammonium, monoisopropanol ammonium, diethyl ammonium and monoisopropyl ammonium.

13. The process of claim 1 wherein, in said reactive modifier, n is zero.

14. The process of claim 1 wherein the composition of polymerizable reactants comprises initially on a 100 weight percent total basis:
about 0.1 to about 95 weight percent of said reactive modifier, and correspondingly
about 99.9 to about 5 weight percent of said vinyl monomer.

15. The process of claim 1 wherein said solvent comprises an organic liquid which is substantially inert relative to said vinyl monomer, said catalyst and said reactive modifier.

16. The process of claim 15 wherein said solvent is selected from the group consisting of benzene, toluene, xylene, ethyl acetate, methylalcohol and dimethylformamide.

17. The process of claim 1 wherein the weight ratio of monomer to solvent is in the range of about 1:20 to about 20:1.

18. The process of claim 1 wherein said vinyl monomer is selected from the group consisting of vinyl esters, (meth)acrylic esters, $\alpha,\beta$-unsaturated carboxylic acids, $\alpha,\beta$-unsaturated amides, N-methacrylic amide, N-methylacrylic amide, $\alpha$-olefins, substituted alpha-olefins, conjugated dienes, alkyl vinyl ethers, alkyl vinyl ketones, maleic anhydride, maleates, itaconic esters, and crosslinking divinyl compounds.

19. The process of claim 1 wherein said polymerization catalyst is selected from the group consisting of t-butylhydroperoxide, di-t-butylperoxide, cumenehydroperoxide, acetylperoxide, benzoylperoxide, lauroylperoxide, azobisisobutylonitrile, azobis-2,4-dimethylvaleronitrile and azobiscyclohexanecarbonitrile and is used in an amount of about 0.05 to about 5 percent by weight relative to the monomer used.

20. The process of claim 1 wherein said polymerization catalyst is a redox catalyst which is a combination of a peroxide catalyst and a reducing agent wherein the weight ratio of said peroxide catalyst to said reducing agent is in the range of about 1:4 to about 4:1.

21. The process of claim 1 wherein the amount of said reactive modifier is in the range of about 10 to about 80 weight percent based on the combined weight of the reactive modifier with the vinyl monomer.

22. The process of claim 1 wherein the amount of said reactive modifier is in the range of about 0.1 to about 20 weight percent based on the combined weight of said reactive modifier with said vinyl monomer.

* * * * *